United States Patent [19]

Rackin

[11] Patent Number: 4,852,087
[45] Date of Patent: Jul. 25, 1989

[54] RECEIVER DATA GATE WITH AUTOMATIC GAIN CONTROL

[75] Inventor: Mark H. Rackin, Dunwoody, Ga.

[73] Assignee: Solid State Systems, Inc., Kennesaw, Ga.

[21] Appl. No.: 298,830

[22] Filed: Jan. 18, 1989

Related U.S. Application Data

[63] Continuation of Ser. No. 72,103, Jul. 10, 1987, abandoned, which is a continuation-in-part of Ser. No. 804,276, Dec. 3, 1985, abandoned.

[51] Int. Cl.$^4$ ............................................... H04J 1/14
[52] U.S. Cl. ..................................................... 370/76
[58] Field of Search ................... 370/69, 76, 121, 122; 375/8

[56] References Cited

U.S. PATENT DOCUMENTS

| | | | |
|---|---|---|---|
| 4,302,629 | 11/1981 | Foulkes et al. | 370/122 |
| 4,577,310 | 3/1986 | Korsky et al. | 370/58 |
| 4,646,289 | 2/1987 | Tsiakas et al. | 370/76 |
| 4,669,090 | 5/1987 | Betts et al. | 375/8 |

Primary Examiner—Robert L. Griffin
Assistant Examiner—Wellington Chin
Attorney, Agent, or Firm—Jones, Askew & Lunsford

[57] ABSTRACT

A telephone system that is useful for facilitating both voice and data communications uses an analog gate. An incoming data signal periodically enters the analog gate. A signal processing means receives the incoming data signal from the gate and an outgoing data signal turns off the gate. The signal processing means includes an automatic gain control for controlling the amplitude of the incoming data signal. The outgoing data signal turns off the gate preventing the outgoing signal from affecting the automatic gain control.

9 Claims, 1 Drawing Sheet

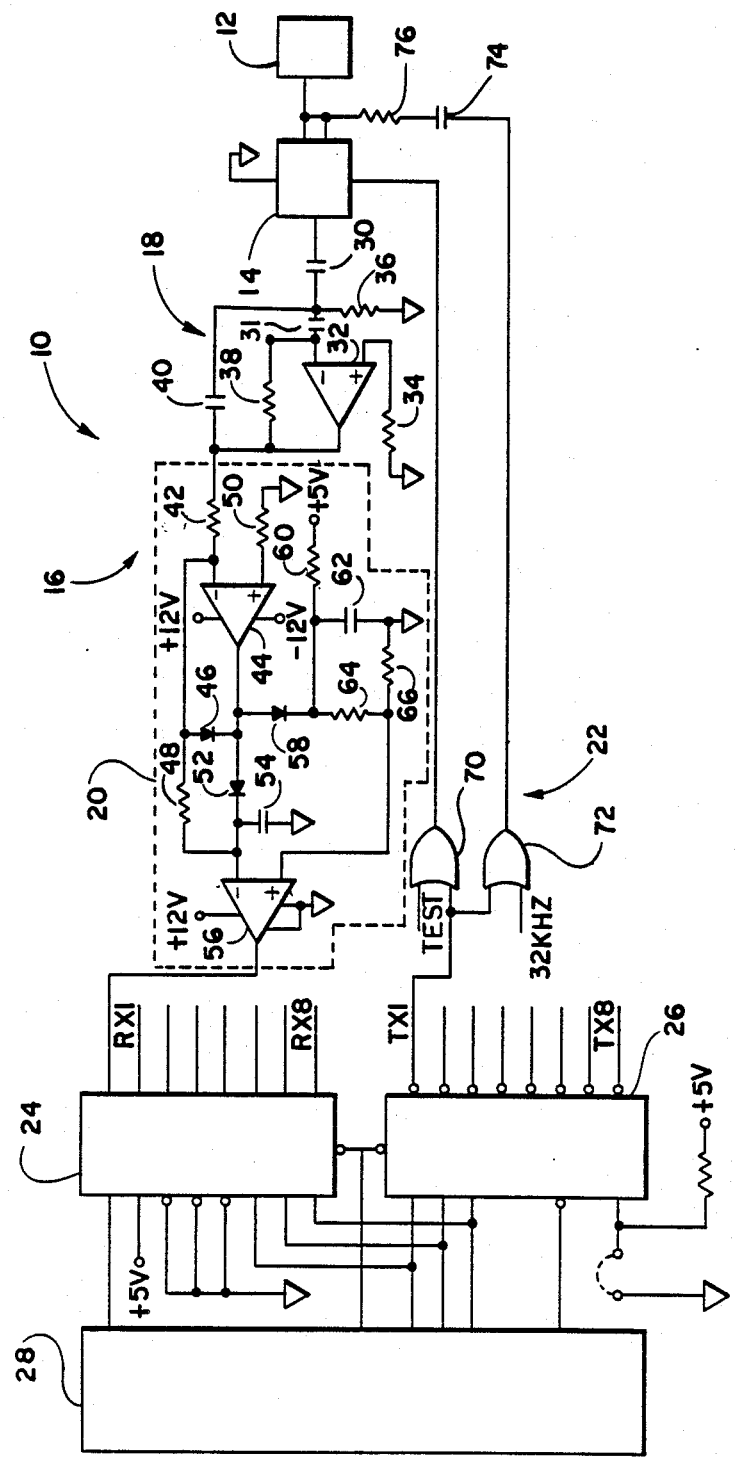

RECEIVER DATA GATE WITH AUTOMATIC GAIN CONTROL

CROSS-REFERENCE TO RELATED APPLICATIONS

This is a continuation of application Ser. No. 072,103, filed 7/10/87, now abandoned, which is a continuation-in-part of 804,276 filed Dec. 3, 1985 for an Electronic Telephone Interface Converter, now abandoned.

TECHNICAL FIELD

This invention relates generally to telephone switching systems and more particularly to a data gate for the interfacing of electronic telephones and telephone switching systems for the transmission of data.

BACKGROUND OF THE INVENTION

As a business or other enterprise grows, its telecommunications needs grow also. With continued growth, a point is reached where simple telephones are no longer adequate and an advanced or enhanced telephone system becomes necessary. Such enhanced telephone systems generally offer a variety of features including the ability to handle both voice and data. Typically, voice and data communications are separated by transmitting data signals at a higher frequency than voice signals. Generally, the upper limit of the audible frequency range is about 20,000 Hz, with telephone systems normally operating at audible frequencies of about 4,000 Hz or less. Transmitting the data at frequencies of about 30,000 Hz or more separates the voice frequency signals and the data frequency signals. Because voice and data travel over the same telephone lines, it is desirable to provide as much separation between the signals as possible. It will be appreciated that it would be highly desirable to provide a telephone system which separates voice and data signals thereby preventing interference.

A private branch exchange (PBX) is a telephone system suitable for business use which allows the transmission of voice signals. Many private branch exchanges also transfer data signals within the various points in the exchange. These data signals are primarily used for controlling the exchange switch and telephone sets.

In one particular PBX, the SX-200, manufactured by Mitel, Inc., Ontario, Canada, voice signals are passed in the band below 3 kHz, and data signals transferred by modulating a carrier having a nominal frequency of 32 kHz. In the PBX, half-duplex communications are used for transferring data between the switch and the electronic telephone connected to the switch. The data is recovered by demodulating the modulated carrier. In order to minimize the data error rate, while allowing for differences in output power of different devices, and different line lengths and losses between different devices, each device contains therein a 32 kHz receiver with an automatic gain control (AGC) circuit. An example of such an AGC circuit is shown in application Ser. No. 804,276.

In half-duplex communications, it is generally necessary to disable the receiver AGC circuit while transmitting. This arises because the higher signal strength of the local transmitter will cause the AGC circuit to decrease its effective gain. Then, when the local transmitter ceases transmitting, the AGC circuit gain will be at a level inappropriate for properly receiving weaker signals from a transmitter located in another, remote device.

One method, described in application Ser. No. 804,276, is to use the transmitter enabling signal to disable the AGC circuit. However, this transmitter enabling signal is not available in some systems. Furthermore, in order to reduce the number of control lines required, it is often desirable to eliminate the transmitter enabling signal. In such cases, only the data to the transmitter and modulated data carrier from the transmitter may be available. Therefore, there is a need for a receiver AGC circuit which is automatically disabled when data is provided to the transmitter.

SUMMARY OF THE INVENTION

Briefly stated, in accordance with one aspect of the invention, a communications system comprises a plurality of communications devices and a multiplexer connected to the system. The communications system also includes a plurality of modulators/demodulators, all of which are connected to the multiplexer and each of which is connected to a respective one of the communications devices whereby transmitted data is modulated prior to being multiplexed and received data is demultiplexed prior to being demodulated.

In accordance with another aspect of the invention, a communications system comprises a gate. An incoming data signal periodically enters the gate. An outgoing data signal turns off the gate preventing the outgoing signal from interfering with the operation of the communications system.

It is an object of the present invention to provide a communications system which facilitates communications of voice and data from one telephone in the system to another telephone in the system, to a telephone in a remote system, or data to and from a central subsystem of a telephone system. This object is achieved by providing appropriate circuitry whereby telephones in the system can communicate with one another for both voice and data communication and also communicate with other systems as well.

Another object of the present invention is to provide for an efficient data flow. This object is achieved by controlling operation by the data gate so an outgoing data signal turns off the gate preventing the outgoing signal from interfering with the gain of the gain control circuitry.

Still another object of the present invention is to provide a telephone system which modulates data signals near the source. This object is achieved by providing each telephone instrument with its own modulator/demodulator connected between the individual telephone instruments and the multiplexer to thereby modulate/demodulate signals from each telephone station.

Other aspects, objects and advantages of the present invention will become apparent upon reading the following detailed description of the preferred embodiment of the present invention when taken in conjunction with the accompanying drawings and appended claims.

BRIEF DESCRIPTION OF THE DRAWING

The Figure is a schematic block diagram of a preferred embodiment of a telephone system illustrating the relationship between a multiplexer, modulator/demodulator and data gate constructed and arranged according to the present invention.

DETAILED DESCRIPTION OF THE PREFERRED EMBODIMENT

Referring to the Figure, a telephone system, such as a private branch exchange ("PBX") 10 is schematically illustrated. The PBX 10 includes a diplexer 12 which splits incoming composite voice/data signals from an electronic telephone into a voice signal and a data signal. Diplexer 12 also acts as a bandpass filter which has a center frequency of about 32 kHz and a bandwidth of about 8 kHz.

The PBX 10 also contains an analog gate 14, a demodulator 16, a bandpass filter 18, and a data recovery and automatic gain control circuit 20. The demodulator 16 demodulates incoming data signals and a modulator 22 modulates outgoing data signals. A multiplexer 24 is connected to the demodulator 16 and a demultiplexer 26 is connected to the modulator 22. The multiplexers 24, 26 are connected between the demodulator 16, modulator 22 and other PBX switching and control circuitry 28. As illustrated, an incoming data signal comes through diplexer 12, analog gate 14, bandpass filter 18, demodulator 16 and to multiplexer 24. On the other hand, an outgoing data signal comes through demultiplexer 26 and is modulated by the modulator 22 prior to being output to the diplexer 12. The diplexer 12, data recovery circuit 20, modulator 22, multiplexers 24, 26 and the PBX control circuitry 28 are more fully described in copending application Ser. No. 804,276 which is incorporated herein by reference.

As illustrated, there is one modulator 22 and one demodulator 16 associated with each diplexer 12, and consequently, with each electronic telephone. Each multiplexer 24, 26 can accommodate eight circuits, and as arranged, multiplexer 24 is connected to eight demodulators 16 while demultiplexer 26 is connected to eight modulators 22. By this construction, incoming data from an electronic telephone is demodulated prior to being multiplexed and outgoing data to an electronic telephone is demultiplexed prior to being modulated.

The gate 14 has its input connected to the output of diplexer 12 so that a data signal periodically enters the gate 14. Data signals output from the gate 14 are received by the signal processing means including the bandpass filter 18 and the data recovery and AGC circuit 20. An outgoing data signal turns off the gate 14 thereby preventing interference with incoming data signals.

The output from data gate 14 is coupled by capacitor 30 to the bandpass filter circuitry 18 including an operational amplifier 32. The noninverting input of operational amplifier 32 is connected through resistor 34 to ground. The coupling capacitor 30 is connected to the junction of resistor 36 and capacitors 31 and 40. The other end of capacitor 31 is connected to one end of resistor 38 and the inverting input of operational amplifier 32. Resistor 36 has one end connected to the junction of capacitors 30, 31 and 40 and the other end is grounded. Resistor 38 has one end connected to the inverting input of operational amplifier 32 and the other end connected to the output of amplifier 32. Capacitor 40 has one end connected to the output of amplifier 32 and the other end connected to the junction of capacitors 30 and 31 and resistor 36. By this construction, an amplifier circuit is provided which has a high gain at the frequency band of 32 kHz but strongly rejects signals at lower or higher frequencies.

The output of the bandpass filter 18 is connected to one end of input resistor 42. The other end of input resistor 42 is connected to the inverting input of operational amplifier 44, the anode of diode 46, and one end of a feedback resistor 48. The noninverting input of operational amplifier 44 is connected through resistor 50 to ground. The output of operational amplifier 44 is connected to the cathode of diode 46, the anode of diode 52, and the anode of diode 58. the cathode of diode 52 is connected to the other end of feedback resistor 48, one end of a filter capacitor 54, and the inverting input of comparator 56. The other end of filter capacitor 54 is gounded. The data recovery circuit 20 includes an envelope detector basically formed of components 42, 44, 46, 48, 50, and 54. In order to produce a clean logic one or logic zero output relatively independent of the amplitude of the input signal from an electronic telephone, recovery circuit 20 also has a one-half peak amplitude detector formed basically of components 58, 60, 62, 64, and 66.

The cathode of diode 58 is connected to one end of a resistor 60, one end of a resistor 64, and one end of a filter capacitor 62. The other end of resistor 60 is connected to a reference voltage $V_R$, which is +5 volts. The other end of resistor 64 is connected to the noninverting input of comparator 56 and one end of resistor 66. The other end of resistor 66 and the other end of capacitor 62 are grounded. A diode 58 and capacitor 62 form a peak detector, resistors 64 and 66 form a one-half voltage divider, and resistors 60 and reference voltage $V_R$ set a minimum voltage for the noninverted input of comparator 56 which sets the logic one/logic zero transition level for comparator 56. When the envelope voltage at the inverting input of comparator 56 exceeds the one-half peak voltage at the noninverting input of comparator 56, the output of the comparator 56 will be a logic zero. Likewise, when the envelope voltage is less than the one-half peak voltage, the output of comparator 56 will be a logic one. Comparator 56 therefore performs both envelope voltage-to-logic one/logic zero conversion and data inversion. Data inversion is necessary because the presence of a data carrier denotes a logic zero for the data.

Modulator 22 contains two input OR gates 70 and 72. One input of each of the OR gates 70, 72 is connected to multiplexer 26. The second input of OR gate 70 receives a test signal and the second input of OR gate 72 is coupled through a DC blocking capacitor 74 that is connected in series with a resistor 76 connected to the analog gate 14 and to the diplexer 12. The output of OR gate 70 is connected to the analog gate 14 and controls operation of the gate.

During operation, data is transmitted from multiplexer 26 over line TX 1 to the common inputs of OR gates 70 and 72. Assuming that the test signal at the other input of gate 70 is a logic zero, then a logic zero signal coming over line TX 1 causes the output of gate 70 to go to a logic zero disabling analog gate 14. When analog gate 14 is disabled, data cannot be routed from the diplexer 12 or from the input of the analog gate 14 to the bandpass filter circuit 18 and data recovery and AGC circuit 20. Incoming data cannot be received when the output of OR gate 70 is a logic zero. The gate 70 can have a logic one output whenever a logic one signal is input to either of its two inputs. So, a logic one signal on the test input can enable analog gate 14 as well as a logic one on the data signal on line TX 1. Similarly, the output of gate 72 will be a logic one when either of its inputs is a logic one. Because one input of gate 72 receives the 32 kHz signal, its output changes between logic zero and logic one at the input frequency of 32 kHz on when the input on TX 1 is a logic zero, thereby modulating the 32 kHz carrier frequency. The output of gate 72 is filtered through resistor 76 and capacitor 74, providing a high impedance path for low frequency signals, and the modulated, filtered signal is input to the diplexer 12.

Whenever the output of gate 70 is a logic zero, the analog gate 14 is disabled so that signals are not transmitted from its input to its output. This is especially useful because it prevents the signal transmitted from gate 72 through capacitor 74 and resistor 76 from being received by the AGC 18 and demodulator 16. This is extremely useful because the idea is to transmit the modulated signal out to the diplexer 12 and not back into the analog gate 14, unless the test signal has been set to a logic one, permitting monitoring of the transmitted data.

An incoming signal is received by the diplexer 12. The diplexer 12 separates the voice and data signals and transmits the data signal to the analog gate 14. The PBX control circuitry 28 is alerted of an incoming transmission so the output of gates 70 and 72 is a logic one. The incoming data signal is further filtered by decoupling capacitor 30 and the bandpass filter 18 so that all signals in the voice frequency range are eliminated. The remaining data signal is then input to the data recovery circuit 20 where the signal is further filtered and processed to recover the transmitted data. The recovered data is sent over line RX 1 to the multiplexer 24.

It wil now be appreciated that there has been presented a telephone system which facilitates communication of both voice and data from one telephone in the system to another telephone. Each telephone in the system has its own modulator and demodulator while a total of eight individual telephones can share a multiplexer. A data switch is provided which controllably disconnects the demodulator circuitry when a transmission is being made so that the transmitted signal is not fed back into the system. The telephone system separates voice and data signals traveling over the same line thereby preventing interference. The telephone system automatically positions the AGC circuit gain at a level appropriate for properly receiving weaker signals from a transmitter located in another, remote device. In half-duplex communications, it is generally necessary to disable the receiver AGC circuit while transmitting. The present invention disables the AGC circuit without using a transmitter enabling signal that is not always present for each system. The present invention is thus able to control the level of the AGC circuit in systems where only the data to the transmitter and modulated data carrier from the transmitter are available.

While the invention has been described with reference to a preferred embodiment, it will be understood by those skilled in the art that various changes may be made and equivalents may be substituted for elements thereof without departing from the true spirit and scope of the invention. In addition, many modifications may be made to adapt a particular situation and material to the teachings of the invention without departing from the essential teachings of the present invention. For example, while the invention has been described in detail for a telephone system, it is apparent that the same switching circuitry may be equally applicable to other types of communications systems wherein it is desired to disable a portion of the system while transmitting or to otherwise maintain a predetermined condition in a portion of the system.

I claim:

1. A communications system, comprising:
   a plurality of signal paths;
   a plurality of communications devices, each of said communications devices being connected to a predetermined one of said signal paths;
   means for generating a multiplexed outgoing data signal comprising a plurality of outgoing data signals, each outgoing data signal of said plurality of outgoing data signals having a first state and a second state;
   a demultiplexer for converting said multiplexed outgoing data signal into said plurality of outgoing data signals;
   means for generating a carrier;
   a plurality of modulators connected to said demultiplexer, each modulator of said plurality of modulators being connected to a respective one of said plurality of communications devices by a respective one of said plurality of signal paths and being for placing an outgoing modulated data signal on a respective one of said plurality of signal paths by passing said carrier when a respective one of said plurality of outgoing data signals is in said first state and blocking said carrier when said respective one of said plurality of outgoing data signals is in said second state;
   a plurality of data gates, each data gate of said plurality of data gates being for receiving a respective one of a plurality of incoming data signals from a respective one of said plurality of communications devices over a respective one of said plurality of signal paths, each data gate of said plurality of data gates providing a respective one of a plurality of gated incoming data signals by passing said respective one of said plurality of incoming data signals when said respective one of said plurality of outgoing data signals is in said second state and blocking signals on said respective one of said plurality of signal paths when said respective one of said plurality of outgoing data signals is in said first state;
   a plurality of automatic gain control means, each automatic gain control means of said plurality of automatic gain control means being coupled to a respective one of said plurality of data gates for receiving a respective one of said plurality of gated incoming data signals and for providing a level of gain appropriate for proper demodulation of said respective one of said plurality of gated incoming data signals;
   a plurality of demodulators, each demodulator of said plurality of demodulators being connected to a respective one of said plurality of automatic gain control means for demodulating a respective one of said plurality of gated incoming data signals received from said plurality of automatic gain control means to provide a respective demodulated incoming data signal of a plurality of demodulated incoming data signals;
   a multiplexer for providing a multiplexed incoming data signal by multiplexing said plurality of said demodulated incoming data signals; and
   means for receiving said multiplexed incoming data signal;

whereby each said data gate prevents said respective one of said plurality of outgoing modulated data signals from affecting a respective automatic gain control means by blocking said respective one of said plurality of outgoing modulated data signals when said respective one of said outgoing data signals causes said carrier to be placed on said respective one of said plurality of signal paths.

2. The communications system of claim 1 wherein each said data gate comprises an analog gate.

3. The communications system of claim 1 wherein each said modulator comprises an OR-gate.

4. The communications system of claim 1 and further comprising a plurality of bandpass filters, each bandpass filter of said plurality of bandpass filters being connected between a respective one of said plurality of data gates and a respective one of said plurality of automatic gain control means.

5. The communication system of claim 1 wherein each one of said plurality of communications devices comprises an electronic telephone.

6. A communications system, comprising:
means for generating an outgoing data signal having a first state and a second state;
means for generating a carrier;
modulating means for placing an outgoing modulated data signal on a signal path by passing said carrier when said outgoing data signal is in said first state and blocking said carrier when said outgoing data signal is in said second state;
a data gate for receiving an incoming data signal from said signal path and providing a gated data signal by passing said incoming data signal when said outgoing data signal is in said second state and blocking signals on said signal path when said outgoing data signal is in said first state;
automatic gain control means coupled to said data gate for receiving said gated data signal and for providing a level of gain appropriate for proper demodulation of said gated data signal; and
demodulation means for demodulating said gated data signal received from said automatic gain control means to provide a demodulated incoming data signal;
whereby said data gate prevents said outgoing modulated data signal from affecting said automatic gain control means by blocking said outgoing modulated data signal when said outgoing data signal causes said carrier to be placed on said signal path.

7. The communication system of claim 6 wherein said data gate comprises an analog gate.

8. The communication system of claim 6 wherein said modulating means comprises an OR-gate.

9. The communication system of claim 6 and further comprising a bandpass filter connected between said data gate and said automatic gain control means.

* * * * *